United States Patent Office 3,654,090
Patented Apr. 4, 1972

3,654,090
METHOD FOR THE DETERMINATION OF ANTIGENS AND ANTIBODIES
Antonius Hermanus Wilhelmus Maria Schuurs and Bauke Klaas van Weemen, Oss, Netherlands, assignors to Organon Inc., West Orange, N.J.
No Drawing. Filed Sept. 24, 1968, Ser. No. 762,120
Int. Cl. C12k 1/04
U.S. Cl. 195—103.5                                10 Claims

ABSTRACT OF THE DISCLOSURE

The invention relates to a method for the determination of a component of the antigen-antibody reaction, comprising the use of one component in an insolubilized form and the other one covalently linked to an enzyme. By the addition of a sample of the component to be determined the distribution of the enzyme-labelled component over the liquid and solid phase is altered. The amount of soluble or insoluble enzyme-labelled component can easily be determined in small quantities by the specific enzyme activity, said amount being a measure for the quantity of component in the sample. The invention also comprises the reagents consisting of one component in insolubilized form and the other corresponding one in enzyme-labelled form.

BACKGROUND OF THE INVENTION

A number of immunochemical methods have been developed for the determination of antigens or antibodies, both qualitative and quantitative, for instance immunodiffusion and immuno-electrophoresis, complement fixation, passive haemagglutination and radio-immuno assay. These and other tests are e.g. described in Weir's Handbook of Experimental Immunology (1967), Blackwell Scientific Publications, Oxford and Edinburgh.

The radioimmunoassay is by far the most sensitive method. Quantities down to $10^{-12}$ gram antigen can be detected. It is based upon the competition between radio-labelled and unlabelled antigen for a fixed, limited amount of antibody, as described by R. Yalow and S. Berson in J. Clin. Invest. 39 (1960) 1157. The amount of unlabelled antigen influences the distribution of the labelled antigen in antibody-bound (B) and antibody-free (F) labelled antigen, i.e. the more unlabelled antigen is present, the less labelled antigen gets the opportunity to combine with antibody. In order to obtain conclusive results from the distribution, a good separation between B and F has to be made. Methods, used for this purpose are, for instance, chromatoelectrophoresis, described by S. Berson and R. Yalow in The Hormones, edited by G. Pincus and others, Academic Press, New York (1964), vol. 1V, 557, or insolubilization of the antibodies. This insolubilization can be achieved by chemical means (cross-linking or covalent binding to an insoluble carrier) or by physical methods (adsorption to an insoluble carrier).

SUMMARY OF THE INVENTION

Surprisingly a simple method has now been found for the determination of a component of the antigen-antibody reaction, comprising using a reagent consisting of one component of said reaction in an insolubilized form and the other one covalently linked to an enzyme. The quantity of enzyme-labelled component either in the liquid or the solid phase is a measure for the amount of component in the sample.

According to the present invention, antigen or antibody is labelled with an enzyme, instead of, for instance, radio-iodine. Enzymes can be detected in very small amounts, especially when their turnover rate is high, and measuring enzyme activity is usually less time-consuming than counting radio-activity. Moreover, this test can be performed in every laboratory, while for performance of radioimmunoassays a radio-isotope equipment is needed.

The antigen or antibody conjugate should preferably consist of the immunochemically reactive molecule and one or more enzyme molecules, linked together by one or more covalent bonds. This covalent linking can be achieved either by direct condensation of existing side chains, or by addition of external bridging molecules. Many bivalent or polyvalent agents, bringing about coupling of protein molecules, have been reported in the literature and may be used to obtain conjugates as described above, such as carbodiimides, diisocyanates, p,p'-difluoro-m,m'-dinitrodiphenylsulphone, glutaraldehyde, dimethyladipimate, bisdiazobenzidine, N-ethyl-5-phenylisoxazolium-3'-sulfonate and ethylenemaleic anhydride-copolymers with or without hexamethylene diamine. The conjugates must always retain at least part of both immunochemical and enzymatic activity.

The test can be performed either qualitatively or quantitatively. In the quantitative test, every enzyme can be used. Thus the enzyme assays will include techniques such as colorimetry, spectrophotometry, fluorospectrophotometry or gaseometry. In the qualitative test, the conjugated enzyme should preferably be detected by a colour reaction, i.e. either a coloured substrate or a coloured end-product should participate in the catalysed reaction.

Further possibilities are: The conjugated enzyme generates the substrate for a second enzyme, which gives a coloured end-product. The conjugated enzyme converts a pro-enzyme into an enzyme, which catalyses a reaction with a coloured compound involved. The conjugated enzyme catalyses a reaction wherein substrate or end-product can be stained easily. Many enzymes can be used in reactions as described above, such as peroxidase, $\beta$-glucuronidase, $\beta$-D-glucosidase, $\beta$-D-galactosidase, urease, glucose oxidase+peroxidase, and galactose oxidase+peroxidase.

Obtaining a good separation between the bound and free labelled component is as essential in the present invention as it is in radio-immunoassays. Generally, the same methods for separation can be used in both tests. Separation by insolubilized antibodies is the most suitable method, because of its simplicity of performance. Insolubilization of the antibodies can be brought about by cross-linking, for example with ethylchloroformate, by covalent linking to insoluble carriers, such as agarose, cross-linked dextran or filter paper, or by physical coupling to insoluble carriers, such as plastic bodies.

The test-system described can be varied while keeping the same principle. The following variations are possible:

(1) The system consisting of unlabelled antigen, labelled antigen and insolubilized antibody. As pointed out, the amount of unlabelled antigen determines the amount of labelled antigen that is bound by the antibody.

(2) In a system, consisting of unlabelled antibody, labelled antibody, and insolubilized antigen, the distribution of labelled antibody over antigen-bound and antigen-free provides a tool for measuring the amount of unlabelled antibody.

(3) In a system, composed of antigen, labelled antibody and insolubilized antigen, the amount of soluble antigen can be measured from the distribution of labelled antibody over liquid and solid phase.

(4) The system, consisting of antibody, labelled antigen and insolubilized antibody gives the possibility to measure the amount of soluble antibody from the distribution of labelled antigen over liquid and solid phase.
The variations are summarized in the following scheme:

|  |  |
|---|---|
| Ag ?   ①<br>+ Ab ⊣<br>Ag ✻ | Ag ?   ③<br>+ Ag ⊣<br>Ab ✻ |
| Ab ?   ②<br>+ Ag ⊣<br>Ab ✻ | Ab ?   ④<br>+ Ab ⊣<br>Ag ✻ |

The component with question mark is the one to be determined.
The other components are present in fixed amounts.

Ag = antigen  
Ag ✻ = labelled antigen  
Ag ⊣ = insolubilized antigen  
Ab = antibody  
Ab ✻ = labelled antibody  
Ab ⊣ = insolubilized antibody Although all immunochemically active substances can be determined by the methods described above, they are particularly suitable for assaying substances in very small quantities, for, a very high sensitivity can be reached. For this reason, the radioimmunoassay has been used especially for the assay of polypeptide and protein hormones. The present invention means an improvement in hormone-assays, because performance of the raioimmunoassay is limited to laboratories with the necessary equipment. Endocrinological disorders could be diagnosed in a relatively simply way, using the invention. In most cases a quantitative assay will be needed, but in some special cases—for instance, the diagnosis of pregnancy— a qualitative assay is sufficient. Of course, application is not limited to the estimation of hormones. Other antigenic substances can be measured, too. Besides, antibody titers can be assayed, which might be particularly useful in the diagnosis of, for example, infectious disesases, such as syphilis, rubella and infection caused by haemolytic Streptococci.

For the quantitative test the usual equipment for enzyme assays will be needed, such as a Warburg-apparatus, a colorimeter, a spectrophotometer or a fluorospectrophotometer. A centrifuge may be needed for the separation of bound and free labelled antigen or antibody.

A suitable test-system requires an exact adjustment of the amounts of enzyme-labelled and insolubilized components. The amount of enzyme-labelled component needed in the system is determined by the enzyme-activity of the conjugate. This amount should give an easily measurable enzyme effect under standard conditions, if excess of the component to be determined is added to the test-system. By adding various amounts of the insolubilized components to this fixed amount of enzyme-labelled component, a curve of free labelled component against insolubilized component can be obtained. From this curve can be derived which amount of insolubilized component binds the greater part of the enzyme-labelled component, but releases a measurable amount of labelled component upon addition of a small quantity of the unlabelled component.

The sensitivity of the test, i.e. the minimal amount of unlabelled, soluble component that can be detected, depends on:

(1) the enzyme-activity of the labelled component
(2) the association constants of the antigen-antibody reactions involved. Antisera of very good quality have to employed in order to get satisfactory results
(3) the relative and absolute amounts of labelled and insolubilized component in the system.

The forms wherein the components of the system can be used are numerous. The enzyme-labelled component could be lyophilized, dissolved in a buffer or impregnated on a solid support, for instance on a paper strip. The insolubilized component, which may be prepared as particles of various dimensions, beads, sticks or a strip of some supporting medium, could be suspended, lyophilized or dried.

DESCRIPTION OF THE PREFERRED EMBODIMENTS

Further details of the method and reagents are to be found in the following examples, which are to be regarded as illustrative and not as limiting.

Example 1

A conjugate of human chorionic gonadotropin (HCG) and horse radish peroxidase (HRP) was prepared, according to the following method: To 1 ml. of a 1.5% HCG (9600 IU/mg.)—solution in sodium phosphate buffer, pH 7.5, 0.1 M, at 4° C., 0.02 ml. of toluene-2,4-diisocyanate was added. After vigorous shaking at 4° C. for half an hour, the mixture was centrifuged for half an hour at 2000 g., the supernatant removed and allowed to stand at 4° C. for one hour. The solution was then added to an equal volume of a 1.5% HRP ($E_{403}/E_{275}=3.0$) solution in sodium borate buffer, pH 9.5, 0.1 M, at 37° C. After one hour at 37° C., the mixture was dialyzed overnight against 0.1 M $(NH_4)_2CO_3$.

The dialyzed solution was applied to a column of Biogel P-100, 30×2 cm., equilibrated with sodium phosphate buffer, pH 6.2, 0.05 M. The same buffer was used for elution. The first peak, eluted in the void volume of shortly after that contained both immunochemically active HCG and enzymatically active HRP. That HCG and HRP are conjugated is proved by the precipitation of enzyme-activity with insolubilized anti-HCG γ-globulins, which will be described in the next two paragraphs.

Rabbit antiserum against highly purified HCG was fractionated by means of DEAE-cellulose-adsorption. The γ-globulins obtained were coupled to agarose with cyanogen bromide.

The composition of the test-reagent was determined by adding various dilutions of a suspension of the insolubilized antibodies (50 mg./ml.) to equal volumes of the conjugate-solution (0.1 mg./ml.). After rotating for one hour at 37° C., the insolubilized fraction was removed by centrifuging for 10 minutes at 500 g., and the enzyme-activity in the supernatant was assayed. Undiluted, over 95% of the enzyme activity was bound by the insolubilized antibodies. In the dilutions 1:10, 1:20, 1:30, 1:40, 1:50 and 1:100, respectively 90%, 60%, 30%, 25%, 20% and 10% of the enzyme-activity was bound. Addition of agarose instead of agarose-γ-globulin left all the enzyme-activity in the supernatant. So did the γ-globulin fraction of normal rabbit serum, coupled to agarose.

By variations in the amounts of insolubilized antibody and enzyme-labelled antigen the sensitivity was adjusted to the desired level by the following method: The minimal amount of conjugate needed was determined by the enzymatic effect. An amount that gave an $$E_{460}^{1cm.}=0.500$$

in the HRP-assay after 2 minutes was considered sufficient. For this particular conjugate this was 0.02 mg. 0.2 ml. of the agarose-γ-globulin-suspension was mixed with 0.1 ml. HCG-solution (a dilution series of 0, 0.2, 0.4, 0.8, 1.6, 3.2, 6.3, 12.5, 25 and 50 IU/ml.). After rotating the mixture for 15 minutes at room temperature, 0.2 ml. conjugate solution (0.1 mg./ml.) was added. After rotating for another 15 minutes at room temperature, the insolubilized antibody was removed by centrifugation (500 g., 5 minutes). The peroxidase activity in the supernatant fluid was measured and plotted against the amount of HCG added. This was done for each of the following insolubilized antibody concentrations: 0.5, 1.0, 2.0, 4.0, 8.0, 16.0 and 32.0 mg./ml. The standard curves obtained showed that decreasing the amount of antibody increased the sensitivity, but decreased the accuracy, because of too high enzyme-activity in the supernatant of a system containing no unlabelled antigen.

With 0.1 mg. insolubilized antibody in the system concentrations of 0–0.4 IU/ml. HCG could be estimated; with 6.4 mg. insolubilized antibody 6.3–50 IU/ml. HCG. A system with 0.02 mg. conjugate and 0.8 mg. insolubilized antibody covered the range 0.4–3.2 IU HCG/ml., and could thus be used for pregnancy testing.

Several scores of urine samples were tested for pregnancy with very satisfactory results.

Solutions, dilutions and suspensions were all made with veronal-buffer, 0.025 M veronal, 0.0025 M $MgCl_2$, 0.0008 M $CaCl_2$, pH 7.3. This goes for the other examples, too.

Example 2

A conjugate of amyloglucosidase (AG) and human serum albumin (HSA) was prepared as follows: The pH of a solution of 10 mg. AG and 10 mg. HSA in 5 ml. 2% sodium carbonate was adjusted to 10.5 with 0.01 M sodium hydroxide. After adding 0.2 mg. of p,p'-difluoro-m,m'-dinitrophenyl-sulphone in 0.2 ml. of cold acetone, the mixture was stirred for 24 hours at 4° C., extensively dialysed against saline and centrifuged at 1500 g. for 20 minutes to remove a small precipitate.

Separation of conjugated an non-conjugated protein was obtained by Biogel P-150 filtration, using a column of 20×1.5 cm. and sodium phosphate buffer, 0.05 M. pH 6.2, for elution. The protein eluted in the void volume contained both immunochemically active HSA and enzymatically active AG, in a conjugated form. Non-conjugated AG and HSA were recovered in a later emerging peak.

The γ-globulin fraction of rabbit antiserum against HSA was insolubilized by coupling to agarose with cyanogen bromide.

The composition of the test system was determined following the method outlined in Example 1. The most favourable composition proved to be: 0.5 ml. of the isolubilized antibody suspension (5 mg./ml.) and 0.3 ml. of the enzyme-antigen conjugate (0.08 mg./ml.).

The 0.5 ml. of insolubilized antibody suspension (5 mg./ml.) 0.2 ml. HSA-solution was added, in the concentrations 0, 0.01, 0.04, 0.08, 0.16 and 0.32 mg./ml. After incubating for two hours at room temperature, 0.3 ml. of the enzyme-labelled antigen (0.08 mg./ml.) was added, and incubation continued for 1 hour. Centrifuging for 10 minutes at 500 g. yielded a clear supernatant, of which the enzyme-activity was assayed. A standard curve was thus obtained.

A follicle stimulating hormone (FSH)-preparation whose HSA-content was unknown was assayed in the system. It contained 0.09 mg. HSA/mg.

Example 3

Rabbit antiserum against HCG was fractionated by means of DEAE-cellulose. The γ-globulins obtained were coupled to HRP, using the method described in Example 1. The γ-globulin was reacted in the first step. Purification of the product was obtained by gelfiltration on Biogel P-300, in 0.05 M sodium phosphate buffer, pH 6.2.

The antigen was insolubilized by coupling highly purified HCG (10.000 IU/mg.) to agarose with cyanogen bromide.

The sensitivity was adjusted to the desired level by the method, described in Example 1. 0.5 ml. of insolubilized antigen suspension (2 mg./ml.) and 0.4 ml. of the labelled antibody solution (0.04 mg./ml.) gave a sensitivity of 1–10 anti IU/ml. (wherein 1 anti IU of antibody can bind 1 IU HCG).

The test-system was used to compare the HCG-binding capacities of two rabbit anti-HCG sera. The first one could bind about 7500 IU HCG/ml., the binding capacity of the second one was unknown. A dilution series of the unknown antiserum was made: 1:125, 1:250, 1:500, 1:1000, 1:2000, 1:4000, 1:8000. 0.1 ml. of each of these dilutions was mixed with 0.5 ml. of the insolubilized antigen suspension. The same was done with 0.1 ml. of the known antiserum, diluted 1:1000 and 1:4000. Incubation for 30 minutes at 4° C., with occasional shaking, was followed by addition of 0.4 ml. of the labelled-antibody solution (0.04 mg./ml.). After 60 minutes at 4° C., the insolubilized antigen was removed by centrifugation (1000 g., 10 minutes), and the enzyme in the supernatant fluid assayed. Comparing with the standard curve taught that under the conditions of the experiment the unknown serum in dilution 1:670 was equal to the known serum in dilution 1:1000, and that the unknown serum in dilution 1:3000 was equal to the known serum in dilution 1:4000. This established the binding capacity of the unknown serum as about 5000 IU HCG/ml.

Example 4

Streptolysin O (Difco Laboratories, Detroit, Michigan, USA) was coupled with glucose-oxidase (10 U/mg.), using 1 - cyclohexyl - 3 - (2-morpholinoethyl)-carbodiimide (MCDI): 10 mg. streptolysin O and 10 mg. glucose oxidase were dissolved in 5 ml. sodium phosphate buffer, 0.01 M, pH 6.5. After adding 10 mg. MCDI, the mixture was shaken for 90 minutes at room temperature. Excess MCDI was removed by ultrafiltration. The product was purified by gelfiltration (Biogel P-300, 0.05 M. sodium phosphate buffer, pH 6.2).

Rabbit antibodies against streptolysin were insolubilized by cross-linking, using ethyl chloroformate as cross-linking agent.

The test-system was composed of the following amounts of reactants: 0.1 ml. of the glucose oxidase-streptolysin O solution (0.7 mg./ml.) and 0.8 ml. of the insolubilized antibody-suspension (0.8 mg./ml.).

A series of 0.1 ml. of an anti-streptolysin O (ASL)-solution, containing 0, 0.5, 1.0, 2.0, 4.0, 8.0, 16.0 and 32.0 IU/ml., and 0.1 ml. of the serum of a patient, suffering from rheumatic fever, were each mixed with 0.1 ml. of the enzyme-antigen-solution (0.7 mg./ml.), and incubated for 10 minutes at 37° C. 0.8 ml. Of the insolubilized antibody (0.8 mg./ml.) was added, the reaction mixture rotated for 30 minutes at room temperature, and centrifuged for 5 minutes at 1000 g. The glucose-oxidase activity in the supernatant fluid was measured. From the standard-curve, the anti-streptolysin O content of the patients serum was read. It was 7.5 IU/ml.

Example 5

The HRP-labelled antibodies to HCG and the agarose-HCG-immuno-adsorbent, used in Example 3 to determine the anti-HCG antibody-content of an unknown serum, can also be used to determine the HCG-content of an unknown sample. Since human luteinizing hormone (LH) shows a strong cross-reaction with HCG, this system can also be used to detect LH.

The composition of the test system is the same as in Example 3. 10 ml. of two test samples (urine of a woman who was expected to ovulate at that time, and of a woman with primary amenorrhoea) were mixed with 0.4 ml. of labelled antibody solution (0.04 mg./ml.). After an incubation of two hours at 37° C., the volume was decreased to about 1.5 ml. by ultrafiltration. 0.5 ml. of the insolubilized antigen-suspension (2 mg./ml.) was added, and the mixture was rotated for 1 hour at room temperature. Centrifugation (5 minutes, 1000 g.) gave a clear supernatant fluid, whose enzyme activity was assayed. The standard curve was obtained by using a standard series of 0.25, 50, 100, 200 and 400 IU LH/ml. in the system. The two samples contained respectively 340 and 45 IU LH/ml.

What is claimed is:

1. Method for the immunochemical determination of a component of the antigen-antibody reaction comprising adding to a sample containing the component to be determined an amount of one component of said antigen-antibody reaction in an insolubilized form and an adjusted amount of the other component covalently linked to an enzyme, allowing the immunochemical reaction to take place, separating the free component from the bound enzyme-labelled component to form two fractions, and determining the enzyme activity of one of these fractions which is a measure of the amount of said component present in the said sample.

2. The method of claim 1 in which there is added to said sample an amount of antibody in insolubilized form and an adjusted amount of the corresponding antigen covalently linked to an enzyme, and in which after the immunochemical reaction the free and bound enzyme-labelled fractions are separated and the enzyme activity of the free fraction is determined.

3. The method of claim 1, in which the component which is to be determined is a hormone.

4. The method of claim 3 in which said hormone is a gonadotropic hormone.

5. The method of claim 1 in which the determination is that of an antibody against an infections micro-organism.

6. The method of claim 1 in which the enzyme is peroxidase.

7. A reagent for the determination of a component of the antigen-antibody reaction, consisting of
   (a) one component in an insolubilized form
   (b) the other component covalently linked to an enzyme.

8. The reagent of claim 7, consisting of
   (a) insolubilized antibody and
   (b) the homologous antigen, covalently linked to an enzyme.

9. The reagent of claim 7, consisting of
   (a) insolubilized antigen and
   (b) the corresponding antibody, covalently linked to an enzyme.

10. The reagent of claim 7, consisting of
    (a) lyophilized, insolubilized antibodies to human chorionic gonadotropin and
    (b) lyophilized conjugate of human chorionic gonadotropin and peroxidase.

References Cited

Annual Review of Biochemistry, vol. 35, Part II, 1966, p. 902.

A. LOUIS MONACELL, Primary Examiner

J. R. HOFFMAN, Assistant Examiner

U.S. Cl. X.R.

424—12

REEXAMINATION CERTIFICATE (10th)

United States Patent [19]

Schuurs et al.

[11] B1 3,654,090

[45] Certificate Issued Jul. 20, 1982

[54] METHOD FOR THE DETERMINATION OF ANTIGENS AND ANTIBODIES

[75] Inventors: Antonius Hermanus Wilhelmus Maria Schuurs; Bauke Klaas van Weemen, both of Oss, The Netherlands

[73] Assignee: Organon Inc., West Orange, N.J.

Reexamination Request
No. 90/000,015, Jul. 1, 1981

Reexamination Certificate for:
Patent No.: 3,654,090
Issued: Apr. 4, 1972
Appl. No.: 762,120
Filed: Sep. 24, 1968

[51] Int. Cl.$^3$ ............................................. G01N 33/54
[52] U.S. Cl. ..... 435/7; 435/28, 435/188; 435/810; 424/12; 23/230B
[58] Field of Search...435/7, 177, 188, 810, 28; 23/230B; 424/8, 12

References Cited

U.S. PATENT DOCUMENTS

| | | | |
|---|---|---|---|
| Re. 29,169 | 4/1977 | Schuurs | 195/103.5 A |
| 3,236,732 | 2/1966 | Arquilla | 167/84.5 |
| 3,293,146 | 12/1966 | Free, et al | 195/103.5 |
| 3,293,147 | 12/1966 | Kosikowski | 195/103.5 |
| 3,472,738 | 10/1969 | Foster | 195/99 |
| 3,519,538 | 6/1970 | Messing, et al | 195/63 |
| 3,555,143 | 1/1971 | Axen, et al | 424/1 |
| 3,565,987 | 2/1971 | Schuurs | 424/12 |
| 3,592,888 | 7/1971 | Wolf | 424/1 |
| 3,615,222 | 10/1971 | Mead | 23/230 |
| 3,639,558 | 2/1972 | Csizmas, et al | 424/12 |
| 3,646,346 | 2/1972 | Catt | 250/83 |
| 3,652,761 | 3/1972 | Weetal | 424/12 |
| 3,720,760 | 3/1973 | Bennich, et al | 424/1 |
| 3,775,536 | 11/1973 | Spector, et al | 424/1 |
| 3,788,948 | 2/1974 | Kagedal, et al | 195/68 |
| 3,798,116 | 1/1974 | Kay | 424/8 |
| 3,790,663 | 2/1974 | Garrison, et al | 424/12 |
| 3,791,932 | 2/1974 | Schuurs, et al | 195/103.5 R |
| 3,839,153 | 10/1974 | Schuurs, et al | 195/103.5 R |
| 3,850,752 | 11/1974 | Schuurs | 195/103.5 R |
| 3,872,225 | 3/1975 | Coller, et al | 424/1 |
| 3,879,262 | 4/1975 | Schuurs, et al | 195/63 |

OTHER PUBLICATIONS

S. Avrameas, "Coupling of Enzymes to Proteins with Glutaraledhyde", IMMUNOCHEMISTRY 6 at 43, et seq. (1969).

ANNUAL REVIEW OF BIOCHEMISTRY 35, Part II at 902 (1966).

L. E. M. Miles and C. N. Hales, "Labelled Antibodies and Immunological Assay Systems", NATURE 219 at 186–189 (indicated publication date—July 13, 1968).

Gurvich, BIOKHIMIYA 26 at 934, et seq. (1961).

Nakane, et al., "Enzyme-Labelled Antibodies: Preparation and Application for the Localization of Antigens", J. HISTOCHEM. CYTOCHEM. 14 at 929, et seq. (1967).

Weir's HANDBOOK OF EXPERIMENTAL IMMUNOLOGY (1967), Blackwell's Scientific Publications, Oxford and Edinburgh.

E. Habermann, "Ein neues Prinzip zur quantitativen Bestimmung hochmolekularer Antigene (Verknupfungstest) unde seine Anwendung auf Tetanustoxin, Serumalbumin and Ovalbumin", Z. KLIN. CHEM. U. KLIN. BIOCHEM. 8 at 51–55 (1970), and translation.

Miles, et al., "The Use of Labelled Antibodies in the Assay of Polypeptide Hormones", J. NUCL. BIO. MED. 13 10, et seq. (1969).

Miles, et al., "An Immunoradiometric Assay of Insulin", pp. 61–70, Proceedings of the International Symposium at Liege, May 19–25, 1968, reported in PROTEIN AND POLYPEPTIDE HORMONES, Part I, Main Reports and Invited Papers (Excerpta Medica Foundation, Amsterdam 1968).

Abraham, et al., "Solid Phase Radioimmunoassay of Serum Estradiol-17$\beta$; A Semi-Automated Approach", IMMUNOLOGIC METHODS OF STEROID DETERMINATION (F. G. Peron, et al. eds.; Meredith Corp., N.Y., 1970) at 87–112 (1970).

Bennich, et al., "Studies on a New Class of Human Immunoglobulins II Chemical and Physical Properties", Nobel Symposium III (ed. by J. Killander) at 199–205 (1967).

Addison, et al., "Two Site Assay of Human Growth Hormone", HORMONE AND METABOL. RES. 3(1) at 59–60 (Jan. 1971).

Berson, et al., "Radioimmunoassay of ACTH in Plasma", J. CLIN. INVEST. 47 at 2725 (1968).

Brzosko, et al., "Antigenic Determinants on Australia Antigen Particles,", Nature 7655 (1) at 1058 (May 1970).

Catt, et al., "Solid-Phase Radioimmunoassay in Antibody-Coated Tubes", SCIENCE 158 at 1570 (1957).

Catt, et al., "Solid-Phase Radiommunoassay of Human Growth Hormone", BIOCHEM. J. 100 at 31c–33c (1966).

Catt, et al., "A Solid Phase Disc Radioimmunoassay for Human Growth Hormone", J. LAB. & LAB CLIN. MED. 70 (5) at 820–830 (November 1967).

Catt, et al., "Disc Solid-Phase Radioimmunoassay of Human Luteinizing Hormone", J. CLIN. ENDO. AND METAB. 28 (1) at 121–126 (January 1968).

Dohlwitz, et al., "Studies on Antibody Formation in Patients Treated with L-Asparaginase", EXPERIMENTAL AND CLINICAL EFFECTS OF L-ASPARAGINASE (ed. by E. Grundmann, et al., Springer-Verlag, New York) (1970) at 198–203.

Gerloff, et al., "Precipitation of Radiolabelled Poliovirus with Specific Anitbody and Antiglobulin", J. IMMUNOLOGY 89 at 559 (1962).

Gurvich, et al., "Use of Antibodies on an Insoluble Support for the Detection of Radioactive Antigens", NATURE 20 at 648-650 (August 1964).

Hales, et al., "Immunoassay of Insulin with Insulin-Antibody Precipitate", BIOCHEM. J. 88 at 137 (1963).

Hamolsky, et al., "The Thyroid Hormone-Plasma Protein Complex in Man. II. A New in Vitro Method for Study of 'Uptake' of Labelled Hormonal Components by Human Erythrocytes", J. CLIN. ENDOCRIN. and METAB., at 33-44 (January 1957).

Hunter, et al., "Preparation of Iodine-131 Labelled Human Growth Hormone of High Specific Activity", NATURE 194 at 495-496 (1962).

Kirkham, et al. (editor), "Edinburgh Conference—September 15-17, 1970, at Edinburgh, Scotland", RADIOIMMUNOASSAY METHODS, pp. 405-488 (1971).

Korenman, "Radio-Ligand Binding Assay of Specific Estrogens Using a Soluble Uterine Macro Molecule", J. CLIN. ENDO. METAB. 28 (1) at 127-130 (1968).

Midgley, "Radioimmunoassay: A Method for Human Chorionic Gonadotropin and Human Luteinizing Hormone", ENDOCRINOLOGY 79 at 10 (1966).

Midgley, et al., "Radioimmunoassays Employing Double Antibody Techniques Karolinska Symposia", ACTA ENDOCR. (Kph.) Suppl. 142, p. 247 (1969).

Miles, et al., "Immunoradiometric Assay of Human Growth Hormone", LANCET 2 at 492-493 (August 31, 1968).

METHODS IN IMMUNOLOGY AND IMMUNOCHEMISTRY (ed. C. A. Williams, et al., Academic Press, New York, 1967), xi-xvii.

RADIOIMMUNOASSAY (pub. K. K. Asakura Shoten), pp. 63-64 and pp. 76-77 (1970).

Murphy, B. E. P., "Some Studies of the Protein Binding of Steroids and Their Application to the Routine Micro and Ultra-micro Measurement of Various Steroids in Body Fluids by Competitive Protein Binding Radioassay", J. CLIN. ENDO. AND METAB. 27 (7) at 973-990 (July 1967).

Porath, "Recent Advances in Separation Methods", Nobel Symposium III (ed. by J. Kellander) at 287-294 (1967).

Salmon, et al., " 'Sandwich' Solid Phase Radioimmunoassay for the Quantitative Determination of Human Immunoglobulins", J. IMMUNOLOGY 103 at 129 (1969).

Salmon, et al., "Sandwich Phase Radioimmunoassays for the Characterization of Human Immunoglobulins Synthesized in Vitro", J. IMMUNOL. 104 (3) at 665-672 (1970).

Spector, et al., "Morphine: Radioimmunoassay", SCIENCE 168 at 1347 (1970).

Walsh, et al., "Detection of Australia Antigen and Antibody by Means of Radioimmunoassay Techniques", J. INFECTIOUS DISEASES 121 at 550 (1970).

Wide, et al., "Radioimmunoassay of Proteins with the Use of Sephadex-Coupled Antibodies", BIOCHIM. BIOPHYS. ACTA 130 at 257 (1966).

Wide, et al., "Diagnosis of Allergy by an In-Vitro Test for Allergen Antibodies", LANCET 2 at 1105-1107 (November 25, 1967).

Wide, "Early Diagnosis of Pregnancy", LANCET, pp. 863-864 (October 25, 1969).

Wide, et al., "Radioimmunosorbent Assay for Proteins. Chemical Coupling of Antibodies to Insoluble Dextran", IMMUNOCHEMISTRY 4 at 381-386 (1967).

Wide, et al., "Radioimmunoassay Employing Immunosorbents", ACTA ENDOCR. (Kph.) Suppl. 142, p. 207 (1969).

Yalow, et al., "Immunoassay of Endogenous Plasma Insulin in Man", J. CLIN. INVEST. 39 at 1157 (1960).

R. S. Yalow, et al., "General Principles of Radioimmunoassay, from Proceedings of Symposium at Oak Ridge Associated Universities on November 13-16, 1967", RADIOISOTOPES IN MEDICINE, IN-VITRO STUDIES (R. L. Hayes, et al. editors, U.S. Atomic Energy Commission, June 1968) at 7-41 (1968).

Cuatrecasas, et al., "Selective Enzyme Purification by Affinity Chromatography", PROC. NAT. ACAD. SCI. BIO. CHEMISTRY 61 at 636 (1968).

Cuatrecasas, "Protein Purification by Affinity Chromatography", J. BIOL. CHEM. 245 at 3059 (1970).

R. Wicker and S. Avrameas, "Localization of Virus Antigens by Enzyme-Labelled Antibodies", J. GEN. VIRAL. 4 at 465-471 (1969), METHODS IN IMMUNODIAGNOSIS at 120-127, ed. by N. Rose, et al. (Wiles) (1971).

Nakane, et al., "Enzyme-Labelled Antibodies: Preparation and Application for the Localization of Tissue Antigens", J. HISTOCHEM. CYTOCHEM. 14 at 929 (1967).

Nakane, et al., "Enzyme-labelled Antibodies for the Light and Electron Microscopic Localization of Tissue Antigens", J. OF CELL BIOL. 33 at 307 (1967).

Porath, et al., "Chemical Coupling of Proteins to Agarose", NATURE 215 at 1491 (1967).

M. Boris Rotman, et al., "Antibody-Mediated Activation of a Defective $\beta$-D-Galactosidase Extracted from an *Escherichia Coli* Mutant", BIOCHEMISTRY 60 at 660-667 (1968).

Axen, et al., "Chemical Coupling of Peptides and Proteins to Polysaccharides by Means of Cyanogen Halides", NATURE 214 at 1302 (1967).

Boyer, (editor), ANNUAL REVIEW OF BIOCHEMISTRY 35 Part II, page 902 (1966).

Miles, et al., "The Preparation and Properties of Purified 125I-Labeled Antibodies to Insulin", BIOCHEM. J. 108 at 611 (1968).

Avrameas, et al., "Method of Marking Antigens and Antibodies with Enzymes and its Application in Immunodiffusion", (French and translation) C. R. ACAD. SC. PARIS, t. 262 (June 13, 1966) Series D-2543, Biochime.

Gocke, et al., "Hepatitis Antigen", LANCET 2 at 7605 (May 31, 1969).

M. Marc Stanislawski, "L'emploi de la peroxydase comme marquer dans la quantification immunochimique d'antigenes et d'anticorps" (French, and translation), C. R. ACAD. SC. PARIS t.271 (October 19, 1970) Series D-1452, Biochime '1455.

Avrameas, "Detection of Antibodies and Antigens with the Aid of Enzymes" (and translation), BULL, SOC. CHIM. BIOL. 50 at 1169 (1968).

Avrameas, "Coupling of Enzymes to Proteins with Glutaraldehyde", IMMUNOCHEMISTRY 6 at 43 (1969).

Avrameas, et al., "The Cross-Linking of Proteins with Glutaraldehyde and its Use for the Preparation of Immunoabsorbents", IMMUNOCHEMISTRY 6 at 53 (1969).

Yagi, et al., "Immunoelectrophoretic Identification of Guinea Pig Anti-Insulin Antibodies", J. IMMUNOL. 89 (5) at 736–744 (1962).

Sternberger, et al., "The Unlabelled Antibody Enzyme Method of Immunohistochemistry" J. HISTOCHEM. CYTOCHEM. 18 at 315 (1970).

Avrameas, "Immunoenzyme Techniques Enzymes as Markers for the Localization of Antigens and Antibodies", INT'L REV. CYTOL. 27 at 349 (1970).

Ostrowski, et al., Autoradiographic Detection of Antigens in Cells Using Tritium-Labelled Antibodies", J. HISTOCHEM. CYTOCHEM. 18 at 490 (1970).

Seracarz, et al., "Antigen Binding to Cells: Determination by Enzymic Fluorogenic Group Hydrolysis", SCIENCE 159 at 884–885 (February, 1968).

Coons, et al., "Fluorescent Antibody Methods", GENERAL CYTOCHEMICAL METHODS (Danielle, ed., Academic Press, New York) 1 at 400–422 (1958).

A. H. W. M. Schuurs, B. K. Van Weemen, R. Matthijsen, E. de Jager, J. D. H. Homan, H. Hell and B. C. Van Goverde, "Purification, Characterization and Immunochemical Properties of Human Chrorionic Gonadotropin", NATURE 212 at 261–262 (1966).

A. H. W. M. Schuurs and R. Assendorp, "The Early Diagnosis of Pregnancy: Experience With a New Immunochemical Pregnancy Test (Pregnosticon Planotest)", MED. GYNAEC. SOCIOL. 2, No. 9 at 6–11 (1967).

A. H. W. M. Schuurs, "Estimation of LH in Unconcentrates Urine by a Variation of the Passive Haemagglutination Inhibition Reaction", ACTA. ENDOCRINOL., Suppl. 119 at 129 et seq (1967).

A. H. W. M. Schuurs, E. de Jager and J. D. H. Homan, "Studies on Human Chorionic Gonadotrophin. III. Immunochemical Characterization", ACTA. ENDOCRINOL. (Copenhagen) 59 at 120–138 (1968).

A. H. W. M. Schuurs, Estimation of LH in Uncontrated Urine by a Modified Hemaagglutination Inhibition Reaction", J. ENDOCRIN, 43: xx (1969).

A. H. W. M. Schuurs, "Agglutination Inhibition Reactions for the Determination of Gonadotrophins", Karolinska Symp. on Res. Meth. In Reprod. Endocrin., ACTA. ENDOCRINOL., Suppl. 142 at 95–112 (1970).

R. Assendorp and A. H. W. M. Schuurs, "A Survey of the Initial Clinical Results Obtained With an Immunochemical Test for Measuring Urinary LH-Excretion", ACTA ENDOCRINOL., Suppl. 141 at 185–195 (1970).

A. H. W. M. Schuurs, and C. J. van Wijngaarden, "A Modified Haemagglutination Inhibition Test and Its Application for the Estimation of Human Luteinizing Hormone in Unconcentrated Urine", ACTA. ENDOCRINOL., Suppl. 141 at 13–31 (1970).

H. van Hell and A. H. W. M. Schuurs, "Further Studies on the Purification and Characterisation of Human Chronic Gonadotrophin", GONADOTROPHINS AND OVARIAN DEVELOPMENT; PROC. OF THE TWO WORKSHOP MEETINGS ON THE CHEMISTRY OF THE HUMAN GONADOTROPHINS AND ON THE DEVELOPMENT OF THE OVARY IN INFANCY; Birmingham, 1969. Edinburgh, Livingstone; W. R. Butt, A. C. Crooke and M. Ryle (Eds.) at 70–76 (1970).

F. C. den Hollander and A. H. W. M. Schuurs, Discussion in Session V, "Solid Phase Antibody Systems", (A Radioimmunoassay System Employing a "Double Antibody Solid Phase" Technique). RADIOIMMUNOASSAY METHODS; European Workshop, Sept. 1970, Edinburgh Conference, Livingstone; K. E. Kirkham and W. M. Hunter (Eds.) at 419–422 (preprint distributed to participants 1970, but published 1971).

A. H. W. M. Schuurs, P. J. Keller and K. Thomas, "A Modified Haemagglutination Inhibition Test for Estimating LH in Unconcentrated Urine; Comparison of the Method With Various Bioassays and With the Radioimmunoassay", HORMONES, LIPIDS and MISCELLANEOUS; 7th Int. Congr. Clin. Chem., Sept. 8–13, 1969; Geneva/Evian, Vol. 3; Karger, Basel at 201–206 (1970).

B. K. van Weemen and A. H. W. M. Schuurs, "Immunoassay Using Antigen-Enzyme Conjugates", FEBS Letters 15(3) at 232–236 (1971).

H. van Hell and A. H. W. M. Schuurs, 'Immunochromatographic Purification of Human Urinary Luteinizing Hormone", J. ENDOCRINOL. 54 at 171–172 (1972).

H. van Hell, A. H. W. M. Schuurs and F. C. den Hollander, "Purification and Some Properties of Human Urinary FSH and LH", GONADOTROPINS, New York, Wiley-Interscience; B. B. Saxena, C. G. Belling and H. M. Gandy (Eds.) at 185–199 (1972).

A. H. W. M. Schuurs and C. J. van Winjngaarden, "Estimation of Follicle Stimulating Hormone (FSH) in Unconcentrated Urine by a Modified Haemagglutination Inhibition Test", SCAND. J. CLIN. LAB. INVEST. 29, Suppl. 126 (1972), Abstr. No. 24.4.

F. C. den Hollander and A. H. W. M. Schuurs, "Radioimmunoassay of Oestrogens (E) Using the 'Double Antibody Solid Phase (Dasp)' Method", SCAND. J. CLIN. LAB. INVEST. 29, Suppl. 126 (1972), Abstract No. 14.17.

F. C. den Hollander and A. H. W. M. Schuurs and H. van Hell, "Radioimmunoassays for Human Gonadotrophins and Insulin, Employing a 'Double-Antibody Solid-Phase' Technique", J. IMMUNOL. METH. *1* at 247-262 (1972).

A. H. W. M. Schuurs, A. Delver, C. J. van Wijngaarden and F. J. Verbon, "Statistically Designed Haemagglutination Inhibition Tests", J. IMMUNOL. METH. *1* at 133-144 (1972).

B. K. van Weemen and A. H. W. M. Schuurs, "Immunoassay Using Hapten-Enzyme Conjugates", FEBS LETTERS *24* (1) at 77-81 (1972).

A. Schuurs and J. Kacaki, "Reversed Haemagglutination Test for Hepatitis B Antigen", INTERNATIONAL CONGRESS, NINTH, ON TROPICAL MEDICINE AND MALARIA; Athens, 14-21 Oct. 1973. Vol. 2: Abstracts of Communications, Athens, at 164 (1973).

F. C. den Hollander, B. K. van Weemen and G. F. Woods, "Specificities of Antisera Against Estrogens Linked to Albumin at Different Positions ($C_6$, $C_{11}$, $C_{16}$, $C_{17}$)"; STEROIDS *23* (4) at 549-560 (1974).

A. H. W. M. Schuurs and J. Kacaki, "Reserved Haemagglutination Test for the Detection of Hepatitis B Antigen", VOX SANG. *27* at 96-114 (1974).

B. K. van Weemen, ENZYME-IMMUNOASSAY. "The Use of Enzyme-Labelled Compounds for Immunoassays of Human Chorionic Gonadotrophin, Luteininzing Hormone Oestrogens." Thesis, Univ. of Groningen, 161 p. (1974).

B. K. van Weemen and A. H. W. M. Schuurs, "Immunoassay Using Antibody-Enzyme Conjugates." FEBS LETTERS *43* (2) at 215-218 (1974).

G. Wolters, P. Thal, A. H. W. M. Schuurs and J. Kacaki, "Hepanosticon in Screening for HBsAg", LANCET *1* at 1193-1194 (1975).

A. M. G. Bosch, H. van Hell, J. A. M. Brands, B. K. van Weemen and A. H. W. M. Schuurs, "Methods for the Determination of Total Estrogens (TE) and Human Placental Lactogen (HPL) in Plasma of Pregnant Women by Enzyme-Immunoassay (EIA)", CLIN. CHEM. *21* at 1009 (1975), No. 358.

A. H. W. M. Schuurs, "Immunochemische Bepalingen van Organische Verbindingen", CHEM. WEEKBL. *71*, No. 18 at 23-25 (1975).

A. H. W. M. Schuurs and G. Wolters, "Hepatitis B Surface Antigen and Human Serum Proteins", AM. J. MED. SCI. *270* at 173-177 (1975).

A. H. W. M. Schuurs and C. J. van Wijngaarden, "A Modified Haemagglutination Inhibition Test for Estimating Human Follicle-Stimulating Hormone (HFSH) in Unprocessed Urine", J. CLIN. ENDOCRINOL. METAB. *40* (4) at 619-628 (1975).

B. K. van Weemen, "Techniques Immuno-Enzymatiques", Abst. 3.6.3., ANN. BIOL. CLIN. (Paris) *33* at 238 (1975).

B. K. van Weemen and A. H. W. M. Schuurs, "The Influence of Heterologous Combinations of Antiserum and Enzyme-Labeled Estrogen on the Characteristics of Estrogen Enzyme-Immunoassays. IMMUNOCHEMISTRY *12* at 667-670 (1975).

J. Kacaki, A. H. W. M. Schuurs, G. Wolters and J. Lalosevic, "Hepatitis-B Antigen in Venereal Diseases", LANCET at 363-364 (1975).

B. K. van Weemen, A. M. G. Bosch, H. van Hell, J. A. M. Brands, G. Wolters, L. P. C. Kuijpers and A. H. W. M. Schuurs, "Enzyme Immunoassay", Organisation des Laboratoires—Biologie Prospective, IIIe COLLOQUE DE PONT-A-MOUSSON (L'Expansion Scientifique Francaise, Paris) at 615-621 (1975).

G. Wolters, L. P. C. Kuijpers, A. H. W. M. Schuurs, "Enzyme Immunoassay (EIA) for HBsAg in Microtiter Plates", Memo H-908/1, HEPATITIS SCIENTIFIC MEMORANDA (July 1975).

B. K. van Weemen and J. Kacaki, "A Modified Hemagglutination Inhibition Test for Rubella Antibodies, Using Standardized, Freeze-Dried Reagents. Reports of a Comparative Multi-Centre Trial", J. HYG. (CAMB) *77* at 31-42 (1976).

G. Wolters, L. P. C. Kuijpers, A. H. W. M. Schuurs and J. Kacaki, "Enzyme-Immunoassay (EIA) of Hepatitis B Surface Antigen (HBsAg) in Mocrotiter Plates", Z. ANAL. CHEM. *279* (2) at 144 (1976).

G. Wolters, P. Thal, J. Kacaki and A. H. W. M. Schuurs, "Screening for HBsAg by Hepanosticon in Microplates", BIOMED. EXPRESS *25* at 72 (1976).

B. K. Weemen and A. H. W. M. Schuurs, "Sensitivity and Specificity of Hapten Enzyme-Immunoassays", IMMUNOENZYMATIC TECHNIQUES; Proceedings of the First International Symposium on Immunoenzymatic Techniques, Held in Paris, 2-4 April, 1975 (Inserm Symp. No. 2); Amsterdam, N. Holl. Publ., 1976 at 125-133. Eds. G. Feldman, P. Druet, J. Bignon and S. Avrameas.

G. Wolters, L. P. C. Kuijpers, J. Kacaki and A. H. W. M. Schuurs, "Solid Phase Enzyme Immunoassay for Detection of Hepatitis B Surface Antigen", J. CLIN. PATHOL. *29* (10) at 873-879 (1976).

A. H. W. M. Schuurs and M. van der Waart, "Towards the Development of Radioenzyme-Immunoassay (REIA)", Z. ANAL. CHEM. *279* (2) at 142 (1976).

G. Wolters, L. P. C. Kuijpers, J. Kacaki and A. H. W. M. Schuurs, "Enzyme-Immunoassay for HBsAg", LANCET *II* at 690 (1976).

H. van Hell, A. M. G. Bosch, J. A. M. Brands, B. K. van Weemen and A. H. W. M. Schuurs, "Pregnancy Monitoring With Enzyme-Immunoassays for Human Placental Lactogen and Total Oestrogens", Z. ANAL. CHEM. *279* at 143 (1976).

J. Kacaki, G. Wolters, L. P. C. Kuijpers and A. H. W. M. Schuurs, "Specificity Control in Solid-Phase Enzyme Immunoassay for HBsAg by One-Step *in situ* Blocking With Human Anti-HBs", J. CLIN. PATHOL. *30* at 894-898 (1977).

M. Van der Waart, A. Bosch, G. Wolters, L. Kuijpers, B. van Weemen and A. Schuurs, "Enzyme-Immunoassay; A New Diagnostic Tool", CHEM. RUNDSCH. *30,* No. *28* at 1-2 (1977).

A. H. W. M. Schuurs and B. K. van Weemen, "Enzyme-Immunoassay", CLIN. CHIM. ACTA *81* at 1-40 (1977).

G. Wolters, L. P. C. Kuijpers, J. Kacaki and A. H. W. M. Schuurs, "Enzyme-Linked Immunosorbent Assay for Hepatitis B Surface Antigen", J. INFECT. DIS. *136,* Suppl., Suppl. S311-S317 (1977).

M. Van der Waart and A. H. W. M. Schuurs, "Nieuwe Ontwikkelingen In Het Gebied van de Enaymimmuunbepalingen", NED. TIJDSCHR. GENEESKD. *121* (36) at 1407 (1977).

A. H. W. M. Schuurs and B. K. van Weeman, "Prinzip des Heterogenen Enzymimmunoassays (EIA Oder Elisa)" ENZYMIMMUNOASSAY: GRUNDLAGEN UND PRAKTISCHE ANWENDUNG; (Workshop 'Enzymimmunoassay' im Rahmen des kongresses Fuer Laboratoriumsmedizin, 15.5–19.5, Berlin (1977)); Stuttgart, Thieme, at 4–9 (1978); W. Vogt (Hrsg.).

B. K. van Weemen, A. Bosch, J. Brands, H. van Hell, L. Kuijpers, A. Schuurs and G. Wolters, "Enzyme-Immunoassays for HBsAg, HPL and Estrogens in Serum", CLIN. BIOCHEM. *10,* No. *2* at 6–7 (1977).

G. Wolters, L. Kuijpers and A. Schuurs, "Enzyme-Immunoassay as a Diagnostic Tool in Viral Hepatitis B", Abst. or Paper Presented at Meeting European Group for Rapid Laboratory Viral Diagnosis and 16th Symposium European Association Against Virus Diseases; Amsterdam 6–9 September, 1977, 1 p.

L. Matthyjseen, O. Schoenherr and B. van Weemen, "Rapid Screening for Rubella Antibodies by Enzyme-Immunoassay", INTERNATIONAL VIROLOGY 4; ABSTRACTS OF THE FOURTH INTERNATIONAL CONGRESS FOR VIROLOGY (Held at The Hague August 30—September 6, 1978), Wageningen, Pudoc, 1978, at 626 Abstr. W 504A/2.

M. van der Waart, A. Snelting, J. Cichy, G. Wolters and A. Schuurs, "Enzyme-Immunoassay for Hepatitis B Related 'e' Antigen (HBeAG)", INTERNATIONAL VIROLOGY 4; ABSTRACTS OF THE FOURTH INTERNATIONAL CONGRESS FOR VIROLOGY (Held at The Hague August 30–September 6, 1978, at 393), Wageningen, Pudoc, 1978, Abstr. W 28/7.

M. van der Waart, A. Snelting, J. Cichy, P. Niermeijer, C. H. Gips, J. R. Huizenga and A. Schuurs, "The Hepatitis B Related 'E' Antigen-Antibody System as Measured by Enzyme-Immunoassay", ANTONIE VAN LEEUWENHOEK *44* at 461–462 (1978).

A. M. G. Bosch, H. van Hell, J. A. M. Brands and A. H. W. M. Schuurs, "Application of Enzyme-Immunoassay to Steroid and Protein Hormones", Abstract of Paper Presented at Quantitative Enzyme Immunoassays; Principles and Clinical Applications; Proceedings of the 1st Conference; Glasgow, 1978. Abstr. No. 6.

A. M. G. Bosch, W. H. J. M. Stevens, C. J. van Wijngaarden and A. H. W. M. Schuurs, "Solid Phase Enzyme-Immunmoassay (EIA) of Testosterone", FRESENIUS Z. ANAL. CHEM. *290* at 98 (1978).

B. K. van Weemen and A. H. W. M. Schuurs, "Principles of Enzyme-Immunoassays", PRINCIPLES OF ENZYME IMMUNOASSAYS; Weinheim, VERL. CHEMIE at 93–98 (1978), H. U. Bergmeyer and K. Gawehn (Eds.).

A. S. Hamblin, R. A. Wolstencroft, D.C. Dumonde, F. den Hollander, A. H. W. M. Schuurs, B. M. Backhouse, D. O'Connell and F. Paradinas, "The Potential of Lymphokines in the Treatment of Cancer", *In:* International Symposium on Biological Preparations in the Treatment of Cancer; Proceedings of the 34th Symposium Organized by the International Association of Biological Standardization and Held at the Royal College of Physicians, London, April 13–15, 1977, at 355–341. Basel, S. Karger (1978), A. H. Griffith and R. H. Regamey (Eds.), DEVELOPMENTS IN BIOLOGICAL STANDARDIZATION, VOL. *38.*

M. van de Waart, A. Snelting, J. Cichy, G. Wolters and A. Schuurs, "Enzyme-Immunoassay for Hepatitis B-Related 'e' Antigen (HBeAG)", Abstract of Paper Presented at the 19th Dutch Federative Meeting of "Med. Biol. Verenigingen"; Rotterdam, 1978 at 427.

A. Schuurs, Introduction to the Microsymposium "Elisa's Vlucht; Toepassingen van de Enzyme-Immunoassay", Abstract of Paper Presented at the 19th Dutch Federative Meeting of "Med. Biol. Vereningingen"; Rotterdam, 1978, at 50.

E. C. Dawson, A. E. H. C. Denissen and B. K. van Weemen, "A Simple and Efficient Method for Raising Steroid Antibodies in Rabbits", STEROIDS *31* at 357–366 (1978).

B. K. van Weemen, A. M. G. Bosch, E. C. Dawson, H. van Hell and A. H. W. M. Schuurs, , "Enzyme Immunoassay of Hormones", SCAND. J. IMMUNOL. *8,* Suppl. 7 at 73–82 (1978).

A. M. G. Bosch, D. M. Dijkhuizen, A. H. W. M. Schuurs and B. K. van Weemen, "Enzyme Immunoassay for Total Oestrogens in Pregnancy Plasma or Serum", CLIN. CHIM. ACTA *89* at 59–70 (1978).

A. M. G. Bosch, H. van Hell, J. Brands and A. H. W. M. Schuurs, "Specificity, Sensitivity and Reproductibility of Enzyme-Immunoassays", ENZYME LABELLED IMMUNOASSAY OF HORMONES AND DRUGS; S. B. Pal (Ed.), Berlin, De Gruyter, at 175–187 (1978).

M. van der Waart, A. Snelting, J. Cichy, G. Wolters and A. Schuurs, "Enzyme-Immunoassay in the Diagnosis of Hepatitis With Emphasis on the Detection of 'E' Antigen (HBeAg)", J. MED. VIROL. *3* at 43–49 (1978).

B. K. van Weemen, A. Bosch, E. Dawson and A. Schuurs, "Enzyme-Immunoassay of Steroids; Possibilities and Pitfalls", Abstr. of Paper Presented at 5th international Congress on Hormonal Steroids; New Delhi, October 29–November 4, 1978 at 16.

B. K. van Weemen, A. M. G. Bosch, E. C. Dawson and A. H. W. M. Schuurs, "Enzyme-Immunoassay of Steroids; Possibilities and Pitfalls", J. STEROID BIOCHEM. *11* at 147–151 (1979).

J. N. Katchaki, M. van der Waart, T. H. Siem, R. Brouwer and A. H. W. M. Schuurs, "The Occurrence of Antibody Markers of Hepatitis B Virus, Infection in an HBsAg-Negative Blood Donor Population", VOX SANG. *37* at 19–13 (1979).

E. C. Dawson, A. M. G. Bosch and B. K. van Weemen, "Enzyme-Immunoassay for Steroids", *In:* RESEARCH ON STEROIDS, VOL. VIII; Proceedings of the Serono Symposia, Vol. 21, LONDON ACAD. PRESS at 139–146 (1979), Eds.: A. Klopper, L. Lerner, H. J. van der Molen, A. D. Transactions of the 8th Meeting of the International Study Group for Steroid Hormones.

A. H. W. M Schuur and B. K. van Weemen, "Enzyme-Immunoassay; A Powerful Analytical Tool", MITT. DISCH. GES. KLIN. CHEM. 10 at 22-31 (1979).

H. van Hell, J. A. M. Brands and A. H. W. M. Schuurs, "Enzyme-Immunoassay of Human Placental Lactogen", CLIN. CHIM. ACTA 91 at 309-316 (1979).

A. Schuurs and B. van Weemen, "Enzyme-Immunologische Bestimmungsverfahren", DIAGN. INTENSIVTHER. 4, 12 No. 2 at 17-18 (1979).

T. C. J. Gribnau, T. van Lith, F. Roeles, C. J. van Wijngaarden, H. van Hell and A. H. W. M. Schuurs, "Immunosorbents Based on Halopyrimidine or Reactor Azodye Activated Polysaccharide Matrices", PROTIDES OF BIOLOGICAL FLUIDS; PROCEEDINGS OF THE 27TH COLLOQUIUM; Bruges, April 30-May 3, 1979, at 793-796. Oxford, Pergamon, H. Peeters (Ed.) (1979).

G. Wolters, L. Kuijpers and A. Schuurs, "Detection of Human Antibodies to Hepatitis B Surface Antigen (HBsAg) by an Enzyme-Immunoassay for HBsAg", J. CLIN. PATHOL. 32 at 1264-1271 (1979).

H. van Hell, A. M. G. Bosch, J. A. M. Brands, A. H. W. M. Schuurs and B. K. van Weemen, "Der Enzymimmunoassay in Der Endokrinologie", In: Praktische Anwendung Des Enzymimmunoassays in Klinischer Chemie und Serologie at 10-19; W. Vogt (Ed.), Stuttgart, Thieme (1979).

F. C. den Hollander, J. I. van Lieshout and A. H. W. M. Schuurs, "Assessment of Activities of Leukocyte Inhibitory Factor (LIF), and of Antibodies Against LIF", BIOCHEMICAL CHARACTERIZATION OF LYMPHOKINES; PROC. OF THE 2ND INT. LYMPHOKINE WORKSHOP; Ermatingen (Switz.), A. L. de Weck, F. Kristensen and M. Landy (Eds.), May 27-31, 1979, New York, Acad. Press at 109-111 (1980).

J. H. W. Leuvering, P. J. H. M. Thal, M. van der Waart and A. H. W. M. Schuurs, "Sol Particle Agglutination Immunoassay for Human Chorionic Gonadotrophin", FRESENIUS Z. ANAL. CHEM. 301 at 132 (1980).

A. M. G. Bosch, H. van Hell, J. Brands, A. H. W. M. Schuurs and B. K. van Weemen, "Enzyme-Immunoassay for Hormones: Preparations of Tracer; Comparison With Radioimmunoassay", IMMUNOENZYMATIC ASSAY TECHNIQUES; PROCEEDINGS OF A EUROPEAN WORKSHOP SPONSORED BY THE COMM. OF THE EUROP. COMMUN., AS ADVISED BY THE COMM. ON MED. AND PUBLIC HEALTH RES., R. Malvano (Ed.); held in Tirrenia (PISA) April 23-27, 1979, the Hague, Nijhoff, 1980; Developments in Clinical Biochemistry, 1 at 1-15 (1980).

J. H. W. Leuvering, P. J. H. M. Thal, M. van der Waart and A. H. W. M. Schuurs, "Sol Particle Immunoassay (SPIA)", J. IMMUNOASSAY 1 at 77-91 (1980).

A. H. W. M. Schuurs and B. K. van Weemen, "Enzyme-Immunoassay; A Poweful Analytical Tool", J. IMMUNOASSAY 1 at 229-249 (1980).

D. C. Dumonde, M. S. Pulley, D. O'Connell, B. M. Southcott, M. R. G. Robinson, F. J. Paradinas, C. C. Rigby, F. den Hollander, A. Schuurs and R. W. de Bruin, "Clinical Effects of Long-Term Lymphokine Injections in Patients With Advanced Carcinoma", INT. J. IMMUNOPHARMACOL. 2 at 190 (1980) (Abstract).

H. Verheul, W. Stimson, F. den Hollander and A. Schuurs, "Prophylactic and Therapeutic effects of Nandrolone and its Decanoate Ester (Deca-Durabolin®) in Murine Lupus", INT. J. IMMUNOPHARMACOL. 2 at 230 (1980) (Abstract).

M. van der Waart, A. Snelting, F. Bruijnis, M. Prins-Bekius, E. Bos, J. Katchaki and A. Schuurs, "Comparison of Enzyme-Labelled F(ab')$^2$ and IgG Conjugates in an Enzyme-Immunoassay for Hepatitis B 'e' Antigen" J. VIROL. METHODS 2 at 85-96 (1980).

A. M. G. Bosch, H. van Hell, J. Brands and A. H. W. M. Schuurs, "Specificity, Sensitivity and Reproducibility of Enzyme-Immunoassays", ENZYME LABELLED IMUNOASSAY HORM. DRUGS, PROC. INT. SYMP. (S. B. Pal, ed.), de Gruyter, Publisher, Berlin, at 175-187 (1980).

B. K. van Weemen and A. H. W. M. Schuurs, Immunochemische Bepalingsmethoden voor Geneesmiddelin", PHARM. WEEKLY 115 at 797-801 (1980).

P. Nermeyer, C. H. Gips, J. R. Huizenga, M. van der Waart and A. H. W. M. Schuurs, "Preference and Significance of Hepatitis $B_e$ Antigen and Anti-Hepatitis $B_e$ Determined by Enzyme Immunoassay in Patients with Acute Chronic and Resolved Heptatitis $B_e$", HEPATO-GASTROENTEROL. 27 (5) at 350-355 (1980).

*Primary Examiner*—Thomas G. Wiseman

*Attorney, Agent, or Firm*—Robert H. Falk; Charles A. Wendel; Francis W. Young

[57] ABSTRACT

The invention relates to a method for the determination of a component of the antigen-antibody reaction, comprising the use of one component in an insolubilized form and the other one covalently linked to an enzyme. By the addition of a sample of the component to be determined the distribution of the enzyme-labelled component over the liquid and solid phase is altered. The amount of soluble or insoluble enzyme-labelled component can easily be determined in small quantities by the specific enzyme activity, said amount being a measure for the quantity of component in the sample. The invention also comprises the reagents consisting of one component in insolubilized form and the other corresponding one in enzyme-labelled form.

REEXAMINATION CERTIFICATE ISSUED UNDER 35 U.S.C. 307.

THE PATENT IS HEREBY AMENDED AS INDICATED BELOW

Matter enclosed in heavy brackets appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, lines 32-39

A number of immunochemical methods have been developed for the determination of antigens or antibodies, both qualitative and quantitative, for instance immunodiffusion and immuno-electrophoresis, complement fixation, passive haemagglutination and [radioimmuno assay]. *radioimmunoassay.* These and other tests are e.g. described in Weir's Handbook of Experimental Immunology (1967), Blackwell Scientific Publications, Oxford and Edinburgh.

Column 2, lines 43-53

Obtaining a good separation between the bound and free labelled component is as essential in the present invention as it is in [radio-immunoassays] *radioimmunoassays.* Generally, the same methods for separation can be used in both tests. Separation by insolubilized antibodies is the most suitable method, because of its simplicity of performance. Insolubilization of the antibodies can be brought about by cross-linking, for example with ethylchloroformate, by covalent linking to insoluble carriers, such as agarose, cross-linked dextran or filter paper, or by physical coupling to insoluble carriers, such as plastic bodies.

Column 3, lines 16-35

Although all immunochemically active substances can be determined by the methods described above, they are particularly suitable for assaying substances in very small quantities, for, a very high sensitivity can be reached. For this reason, the radioimmunoassay has been used especially for the assay of polypeptide and protein hormones. The present invention means an improvement in hormone-assays, because performance of the [radioimmunoassay] *radioimmunoassay* is limited to laboratories with the necessary equipment. Endocrinological disorders could be diagnosed in a relatively simple way, using the invention. In most cases a quantitative assay will be needed, but in some special cases—for instance, the diagnosis of pregnancy—a qualitative assay is sufficient. Of course, application is not limited to the estimation of hormones. Other antigenic substances can be measured, too. Besides, antibody titers can be assayed, which might be particularly useful in the diagnosis of, for example, infectious diseases, such as syphilis, rubella and infection caused by haemolytic Streptococci.

AS A RESULT OF REEXAMINATION, IT HAS BEEN DETERMINED THAT:

The patentability of claims 1-4 and 6 is confirmed.

Claims 5 and 7-10 are determined to be patentable as amended:

5. The method of Claim 1 in which the determination is that of an antibody against an [infections] *infectious* micro-organism.

7. A [reagent] *test-system* for the determination of the antigen-antibody reaction, consisting of:
   (a) one component in an insolubilized form; *and*
   (b) the other component covalently linked to an enzyme, *whereby each of (a) and (b) is provided in a known amount, and the ratio of (a) to (b) is known, wherein the known amounts are sufficient to provide for an optimal measurement for a qualitative or quantitative heterogeneous enzyme immunoassay.*

8. The [reagent] *test-system* of Claim 7, consisting of:
   (a) insolubilized antibody; and
   (b) the homologous antigen, covalently linked to an enzyme.

9. The [reagent] *test-system* of Claim 7, consisting of:
   (a) insolubilized antigen; and
   (b) the corresponding antibody, covalently linked to an enzyme.

10. The [reagent] *test-system* of Claim 7, consisting of:
    (a) lyophilized, insolubilized antibodies to human chorionic gonadotrophin; and
    (b) lyophilized conjugate of human chorionic gonadotrophin and peroxidase.

* * * * *